United States Patent
Coupard et al.

(10) Patent No.: US 12,072,261 B2
(45) Date of Patent: Aug. 27, 2024

(54) METHOD FOR MONITORING ELEMENTS IN A TURBINE ENGINE COMBUSTION CHAMBER

(71) Applicant: SAFRAN AIRCRAFT ENGINES, Paris (FR)

(72) Inventors: Josselin Xavier Coupard, Moissy-Cramayel (FR); François Maurice Marcel Demaison, Moissy-Cramayel (FR); Valentin Francis Joël Facquet, Moissy-Cramayel (FR); Marion Marguerite Jedruszek, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 192 days.

(21) Appl. No.: 17/904,342

(22) PCT Filed: Feb. 18, 2021

(86) PCT No.: PCT/FR2021/050286
§ 371 (c)(1),
(2) Date: Aug. 16, 2022

(87) PCT Pub. No.: WO2021/165620
PCT Pub. Date: Aug. 26, 2021

(65) Prior Publication Data
US 2023/0076221 A1   Mar. 9, 2023

(30) Foreign Application Priority Data

Feb. 21, 2020   (FR) .................................... 2001733

(51) Int. Cl.
*G01M 15/14*   (2006.01)
*F02C 7/266*   (2006.01)

(52) U.S. Cl.
CPC ............ *G01M 15/14* (2013.01); *F02C 7/266* (2013.01); *F05D 2220/323* (2013.01); *F05D 2260/80* (2013.01)

(58) Field of Classification Search
CPC .. G01M 15/14; F02C 7/266; F05D 2220/323; F05D 2260/80
See application file for complete search history.

(56) References Cited

U.S. PATENT DOCUMENTS

| 5,673,554 A | * | 10/1997 | DeFreitas | ............. F02P 23/045 60/776 |
| 2017/0089577 A1 | | 3/2017 | DeSilva et al. | |
| 2023/0076221 A1 | * | 3/2023 | Coupard | ................. F02C 7/266 |

FOREIGN PATENT DOCUMENTS

| FR | 2968143 A1 | 6/2012 |
| FR | 3081925 A1 | 12/2019 |

OTHER PUBLICATIONS

International Search Report for issued in Application No. PCT/FR2021/050286 dated Apr. 23, 2021.

(Continued)

*Primary Examiner* — Eric S. McCall
(74) *Attorney, Agent, or Firm* — Pearne & Gordon LLP (57) ABSTRACT

Method for monitoring an ignition system of an aircraft turbine engine, the ignition system including a combustion chamber fitted with a spark plug and an ignition casing, the turbine engine including an accelerometer and an acoustic sensor. The method includes steps of: acquiring accelerometric and acoustic data representative of spark plug breakdown noises from signals generated by the accelerometer and the acoustic sensor, detecting breakdown peak times from the accelerometric data and the acoustic data, correlating the breakdown peak times detected from the accelerometric data and the breakdown peak times detected from the acoustic data, and establishing a diagnosis of the health (Continued)

of the ignition casing and a diagnosis for the spark plug on the basis of the correlation results.

10 Claims, 4 Drawing Sheets

(56) References Cited

OTHER PUBLICATIONS

Written Opinion for PCT/FR2021/050286 dated Apr. 23, 2021.
Search Report issued in French Patent Application No. 2001733 dated Oct. 8, 2020.

* cited by examiner

METHOD FOR MONITORING ELEMENTS IN A TURBINE ENGINE COMBUSTION CHAMBER

This is the National Stage of PCT international application PCT/FR2021/050286, filed on Feb. 18, 2021 entitled "METHOD FOR MONITORING ELEMENTS IN A TURBINE ENGINE COMBUSTION CHAMBER", which claims the priority of French Patent Application No. 2001733 filed Feb. 21, 2020, both of which are incorporated herein by reference in their entireties.

TECHNICAL FIELD

The present invention relates to the monitoring of the state of health of parts of an aircraft turbine engine. The invention relates more particularly to the monitoring of the elements of the ignition system of an aircraft turbine engine.

PRIOR ART

The ignition system of a turbine engine includes at least one combustion chamber in which one or more spark plugs are installed in order to ensure the ignition of the jet of fuel that is injected into the combustion chamber. The spark plugs are excited by an ignition exciter box itself controlled by an electronic unit, or computer, generally in charge of the regulation.

The start-up of an aircraft turbine engine is carried out according to a predefined regulation, which depends on each engine. The starting of an engine leads to a succession of steps that are characterised by vibrational and acoustic phenomena.

The spark plugs are used to ignite the combustion chambers by producing sparks that will be called breakdown hereinafter. This spark is produced between two electrodes. At each breakdown, particles are stripped from the electrodes, which progressively causes wear. The spark plugs are placed in the flame during operation, which can produce corrosion and coking deposits on these electrodes. Moreover, the fine particles in circulation in the flow can also cause erosion.

The spark plugs thus lose efficiency over time until they no longer produce enough energy to ensure the ignition, which introduces a delay for the planned flight. To avoid this, the spark plugs are changed preventively on the basis of a fixed operating time.

The wear on spark plugs is not the only cause of non-ignition. There can also be ignition exciter box failures. Investigative work must thus be provided to diagnose the cause of non-ignition.

The goal is multiple:
Avoid ignition failures related to wear on the spark plugs,
Discriminate between a failure of the ignition exciter box and spark plug wear in the case of non-ignition,
Avoid changing the spark plugs too early by determining the optimal replacement time.

The air/fuel mixture injected onto the spark plugs in the breakdown phase ignites the combustion chamber. The flame produced engenders a characteristic, low-frequency noise that allows to detect the ignition of the chamber.

The hooting noise is an acoustic phenomenon present in all engines more or less significantly. It is a noise that appears around a low frequency, for example 290 Hz, and which is the object of client unsatisfaction (not associated with a specification). The phenomenon is identified as being a combustion instability inside the combustion chamber. It is liable to appear when the chamber temperature is cold (equal to the outside temperature). A study of the hooting noise can bring to light chamber cracks, or cases of fouling and coking.

Various methods for determining the health of an igniter in a gas turbine engine are known.

According to one example, dynamic pressure sensors responding to the acoustic frequencies capture the sound created by the igniter during the ignition process. The spectral characteristics of the signals captured are then analysed to identify a spectral characteristic that can be used to link a spectral model to an igniter state or condition.

According to another example, the monitoring of the health of the igniters of gas turbine engines is based on a count of the number of sparks generated.

It is also possible to calculate the wear on the igniter of a turbine engine on the basis of the ignition time and the pressure in the combustion chamber.

It is also possible to detect current pulses in the shielding that surrounds a power-supply cable of an igniter, to deduce therefrom a signal indicating the presence of a spark in the igniter.

The monitoring of the health of each of the spark plugs and of the excitation circuit in an ignition system can be carried out by detecting abnormal conditions in the waveforms of the system for generating sparks.

FR 2 968 143 relates to the monitoring of the robustness of ignition of spark plugs subjected to electromagnetic aggressions. This monitoring is based on the analysis of the light radiation emitted by the spark plugs.

DISCLOSURE OF THE INVENTION

The invention aims to solve the problems of the prior art by providing a method for monitoring an ignition system of an aircraft turbine engine, the ignition system including at least one combustion chamber, at least one spark plug in the at least one combustion chamber, an ignition exciter box to excite the at least one spark plug, the turbine engine including at least one accelerometer and at least one acoustic sensor, the method being characterised in that it includes steps of:
acquiring accelerometric and acoustic data representative of breakdown noises of the at least one spark plug, on the basis of signals produced by the at least one accelerometer and the at least one acoustic sensor,
detecting times of breakdown peaks of the at least one spark plug on the basis of the accelerometric data and times of breakdown peaks of the at least one spark plug on the basis of the acoustic data representative of breakdown noises of the at least one spark plug,
correlating the times of the breakdown peaks of the at least one spark plug detected on the basis of the accelerometric data and the times of the breakdown peaks of the at least one spark plug detected on the basis of the acoustic data representative of breakdown noises of the at least one spark plug, and
establishing a diagnosis of health of the ignition exciter box and a diagnosis of the at least one spark plug, according to the results of the correlation step.

Via the invention, the vibrational and acoustic data is correlated to improve the monitoring of the spark plugs and of the ignition exciter box, and of the start-up capacity of the engine.

The invention allows to avoid ignition failures related to wear on the spark plugs.

In the case of non-ignition, it allows to discriminate between an ignition exciter box failure and spark plug wear.

The invention also allows to avoid changing the spark plugs too soon by determining the optimal time of replacement.

According to a preferred feature, the step of acquiring accelerometric and acoustic data includes an extraction of the breakdown signal from the signals produced by the at least one accelerometer and the at least one acoustic sensor and a low-pass filtering of the signals produced by the extraction.

Preferably, sensors dedicated to other functions and already present in the turbine engine are used.

According to a preferred feature, the monitoring method also includes a step of forecasting the service life of the ignition exciter box according to the results of the correlation step and a model of damage to the ignition exciter box.

According to a preferred feature, the monitoring method also includes a step of forecasting the service life of the at least one spark plug according to the results of the correlation step and a model of damage to the at least one spark plug.

According to a preferred feature, the monitoring method also includes steps of:
testing to verify whether the combustion chamber temperature is equal to the outside ambient temperature, and in the case of a positive answer,
extracting the signal corresponding to the ignition from the signals produced by the at least one acoustic sensor,
applying a band-pass filter to the extracted signal, the frequency band of the filter corresponding to hooting phenomenon frequencies,
comparing the acoustic energy of the filtered signal to energies coming from a reference database, to detect a hooting noise or not, and in the case of detection of a hooting noise,
establishing a diagnosis of the health of the combustion chamber.

Via these features, it is possible to monitor the combustion chamber.

According to a preferred feature, the monitoring method also includes a step of establishing a forecast of the health of the combustion chamber.

The invention also relates to a device for monitoring an ignition system of an aircraft turbine engine, the ignition system including at least one combustion chamber, at least one spark plug in the at least one combustion chamber, an ignition exciter box to excite the at least one spark plug, the turbine engine including at least one accelerometer and at least one acoustic sensor, the device being characterised in that it includes a data processing unit capable of acquiring accelerometric and acoustic data representative of breakdown noises of the at least one spark plug, on the basis of signals produced by the at least one accelerometer and the at least one acoustic sensor, detecting times of breakdown peaks of the at least one spark plug on the basis of the accelerometric data and times of breakdown peaks of the at least one spark plug on the basis of the acoustic data representative of breakdown noises of the at least one spark plug, correlating the times of the breakdown peaks of the at least one spark plug detected on the basis of the accelerometric data and the times of the breakdown peaks of the at least one spark plug detected on the basis of the acoustic data representative of breakdown noises of the at least one spark plug, and establishing a diagnosis of health of the ignition exciter box and a diagnosis of the at least one spark plug, according to the results of the correlation step. According to a preferred feature, the data processing unit is also capable of verifying whether the combustion chamber temperature is equal to the outside ambient temperature, and in the case of a positive response, extracting the signal corresponding to the ignition from the signals produced by the at least one acoustic sensor, applying a band-pass filter to the extracted signal, the frequency band of the filter corresponding to hooting phenomenon frequencies, comparing the acoustic energy of the filtered signal to energies coming from a reference database, to detect a hooting noise or not, and in the case of detection of a hooting noise, establishing a diagnosis of the health of the combustion chamber.

The invention also relates to an ignition system of an aircraft turbine engine, including the device presented above.

The device and the ignition system have advantages analogous to those presented above.

In a specific embodiment, the steps of the method according to the invention are implemented by computer program instructions.

Consequently, the invention is also aimed at a computer program on an information support, this program being capable of being implemented in a computer, this program including instructions adapted to the implementation of the steps of a method as described above.

This program can use any programming language, and be in the form of source code, object code, or intermediate code between source code and object code, such as in a partially compiled form, or in any other desirable form.

The invention is also aimed at an information support readable by a computer, and including computer program instructions adapted to the implementation of the steps of a method as described above.

The information support can be any unit or device capable of storing the program. For example, the support can include a storage medium, such as a ROM, for example a CD-ROM or a ROM of a microelectronic circuit, or a magnetic recording medium, for example a disk or a hard disk.

Moreover, the information support can be a transmittable support such as an electric or optical signal, which can be delivered via an electric or optical cable, by radio or by other means. The program according to the invention can be in particular downloaded over a network of the Internet type.

Alternatively, the information support can be an integrated circuit into which the program is incorporated, the circuit being adapted to execute or to be used in the execution of the method according to the invention.

BRIEF DESCRIPTION OF THE DRAWINGS

Other features and advantages will appear upon reading the following description of a preferred embodiment given as a non-limiting example, described in reference to the drawings in which.

Identical, similar or equivalent parts of the various drawings carry the same numerical references so as to facilitate the passage from one drawing to the other.

The various parts shown in the drawings are not necessarily shown according to a uniform scale, to make the drawings more readable.

The various possibilities (alternatives and embodiments) must be understood as not being exclusive of each other and can be combined together.

DETAILED DISCLOSURE OF SPECIFIC EMBODIMENTS

Figure 1:
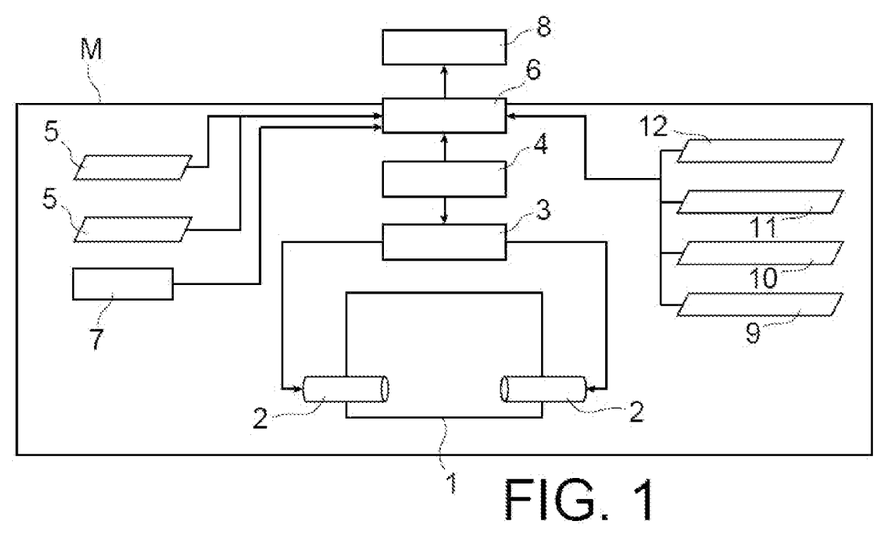
FIG. 1 illustrates a device for monitoring an ignition system of an aircraft turbine engine, according to an embodiment of the invention.

According to a preferred embodiment shown in FIG. 1, the device for monitoring an ignition system of an aircraft turbine engine is provided in a turbine engine M comprising at least one combustion chamber 1 in which one or more spark plugs 2 are installed in order to ensure the ignition of a mixture of air and of fuel injected into the combustion chamber. The spark plug(s) 2 are excited by an ignition exciter box 3 configured to deliver breakdown pulses to the spark plug(s) 2 upon reception of an ignition command provided by a circuit for regulating the ignition 4.

Only the elements useful to the comprehension of the invention are described and shown.

Moreover, the turbine engine M is equipped with one or more vibration sensors 5, generally two accelerometers in order to ensure redundancy. These accelerometers are positioned and used first and foremost to sense the unbalance of the fan of the turbine engine.

The first accelerometer is generally positioned at the front of the turbine engine and the second rather at the rear of the turbine engine, often on a case in order to be able to be accessible during maintenance. The low-pressure shaft (BP) onto which the fan of the turbine engine is attached passes through the entire turbine engine and a low-pressure unbalance is expressed on the various bearings that guide this shaft, at least one at the front and at least one at the rear. The exact position of the accelerometers varies from one engine to another.

The vibration sensors 5 are connected to a data processing unit 6 on board the aircraft to provide it with accelerometric signals. According to alternatives, the data processing unit 6 can be integrated into the regulation circuit 4 or not. The data processing unit 6 is in charge of determining the vibrational level on the basis of the signals that it receives. This vibrational level is transmitted to the cockpit for display on the instrument panel. The pilot thus has available the information necessary to carry out the balancing of the engine.

The accelerometers 5 can also be used to carry out a monitoring of the wear of engine components such as the bearings.

The turbine engine M is also equipped with an acoustic sensor 7, such as a microphone. The acoustic sensor 7 is placed around the gas generator, behind a structure in such a way as to protect it from impacts of particles or from dust. The acoustic sensor 7 is connected to the data processing unit 6 to provide it with acoustic signals. These signals can be used to monitor the rotating elements such as the blades of the turbines and of the compressors, but also the transmission of power (gears) and the combustion chamber.

The turbine engine M is also provided with other sensors, in particular a pressure sensor 9, a temperature sensor 10, a rotation speed sensor 11 and a sensor of position of the variable geometries 12. These sensors are also connected to the data processing unit 6. The acquisition of the signals delivered by the vibration sensors 5, the acoustic sensor 7 and the sensors 9 to 12 is carried out by the data processing unit 6. The acquisition is preferably carried out at a high frequency. The data processing unit 6 includes a digital calculation component (processor or FPGA) and memories that execute processing on the measured signals, typically processing of the signal, recording and transmission of information (communication function).

All or a part of the processing described below can be carried out on the ground by a computer 8 adapted to be connected to the data processing unit 6 when the aircraft is on the ground.

Figure 2:
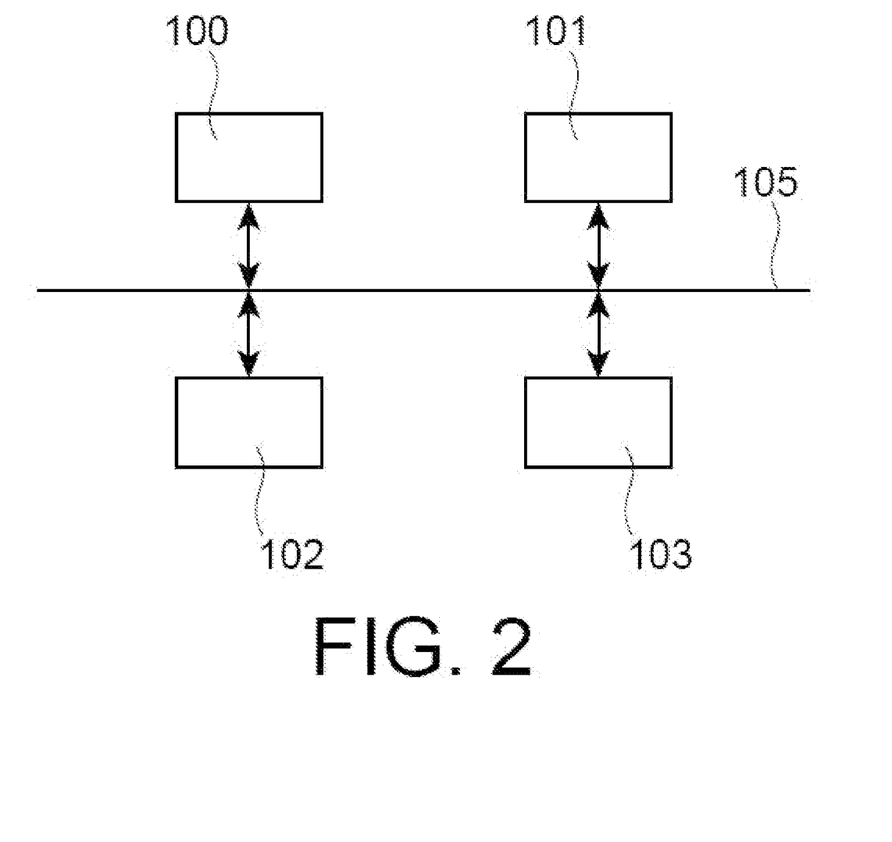
FIG. 2 illustrates a data processing unit comprised in the device of the previous figure, according to an embodiment of the invention.

FIG. 2 shows an embodiment of the data processing unit 6.

The data processing unit 6 has the general structure of a computer. It includes in particular a processor 100 executing a computer program implementing the method according to the invention, a memory 101, an input interface 102 and an output interface 103.

These various elements are conventionally connected by a bus 105.

The input interface 102 is connected to the vibration sensors 5 and to the acoustic sensor 7 and is intended to receive the measured values.

The processor 100 executes the processing disclosed below. This processing is carried out in the form of code instructions of the computer program that are memorised by the memory 101 before being executed by the processor 100.

The memory 101 memorises the measured values, the reference values and the diagnoses established. The memory 101 can be split into various parts to separate the instructions, the reference values and the measured values.

The output interface 103 is connected to at least one out of the FADEC of the engine, another electronic system on board the aircraft, and a system external to the aircraft to deliver the diagnoses established.

Figure 3:
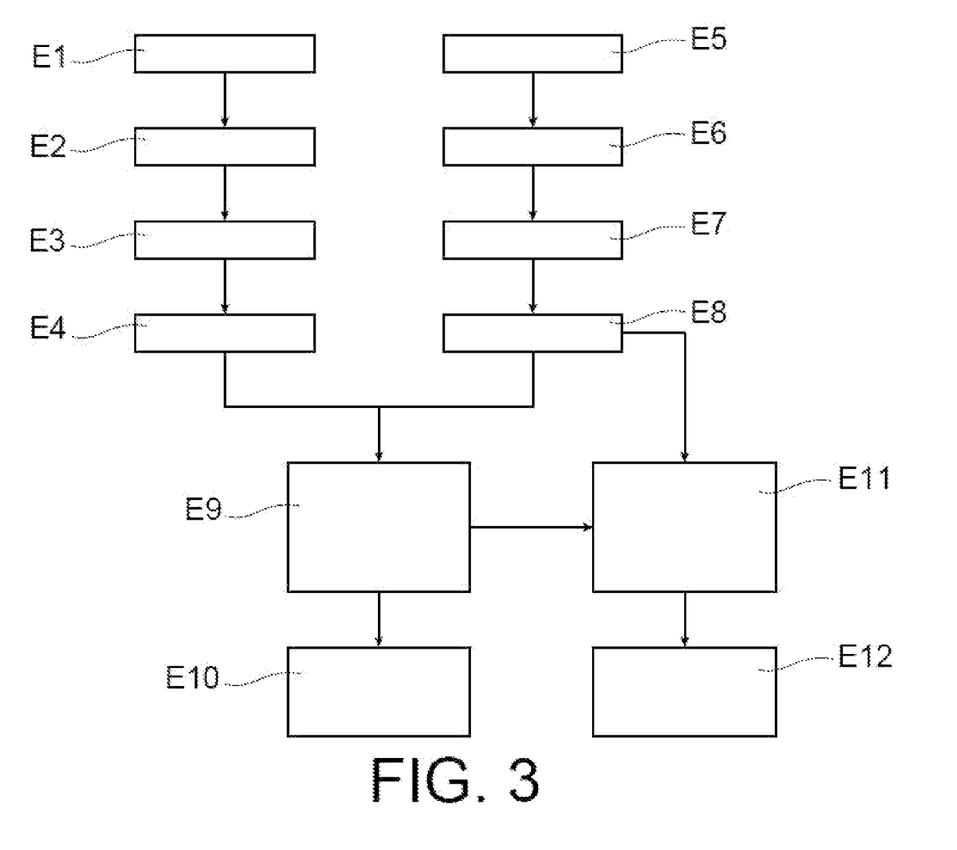
FIG. 3 illustrates a method for monitoring an ignition system of an aircraft turbine engine, according to an embodiment of the invention.

FIG. 3 shows an embodiment of the method for monitoring an ignition system of an aircraft turbine engine, in particular the spark plugs 2 and the ignition exciter box 3. This method includes steps E1 to E12 implemented in the data processing unit 6 or alternatively partly in the data processing unit 6 and partly in the computer 8. These steps are implemented when the spark plugs are controlled for their breakdown.

The steps E1 to E4 implemented to process the vibrational signals are described first of all.

The step E1 is the acquisition of the signals delivered by the vibration sensors 5.

The following step E2 is an extraction of the breakdown signal from the signals acquired in the previous step. For this, the signals acquired are restricted to the periods of time in which the spark plugs 2 are controlled for breakdown. These periods of time are determined by the fact that they correspond to the periods of time during which:

The computer for engine regulation sends a command to the ignition exciter box 3 throughout the period during which the spark plug must break down. The command comprises the selection of the spark plug or of the spark plugs to be made to break down;

The ignition exciter box 3 generates electric signals sent periodically to the spark plug or to the spark plugs selected in order to make them break down.

The following step E3 is a low-pass filtering of the signals produced by the previous step. Indeed, the breakdown of the spark plugs produces low-frequency vibrations, the high frequencies are thus eliminated from the processed signals.

The low-pass filtering can involve undersampling the signal with an anti-folding filter before applying the low-pass filter. This amounts to cascading several low-pass filters. This avoid introducing distortions in the case in which the acquisition of the signals delivered by the vibration sensors is carried out at a high frequency, for example several tens of kHz.

According to one alternative, it is possible to use wavelet filtering, either with a standard wavelet, for example Daubechies, or with a specific wavelet based on the shape of the spark plug breakdown sensed by the vibration sensors.

The following step E4 is a detection of the breakdown peaks in the filtered signals. This is for example a detection of the peaks as local extrema detectable by change of sign of the derivative of the signal or by passage above a threshold.

According to one alternative, it is possible to superimpose the filtered signal onto the raw signal to find the raw signal peak corresponding to the breakdown of the spark plug.

The result of the step E4 is the number of breakdown peaks, their respective amplitude, their respective time of appearance and the time between two successive breakdowns.

The method involves steps E5 to E8 implemented simultaneously to the steps E1 to E4, to process the acoustic signals.

Step E5 is the acquisition of the signals delivered by the acoustic sensor 7.

The following step E6 is an extraction of the breakdown signal from the signals acquired in the previous step. Like in step E2, the signals are restricted to the periods of time in which the spark plugs 2 are controlled for breakdown.

The following step E7 is a low-pass filtering of the signals produced by the previous step.

Indeed, the breakdown of the spark plugs produces a low-frequency noise, the high frequencies are thus eliminated from the processed signals.

The following step E8 is a detection of the breakdown peaks in the filtered signals. This is for example a detection of the peaks as local extrema detectable by change in sign of the derivative of the signal or otherwise by passage above a threshold. The result of the step E8 is the number of breakdown peaks, their respective amplitude, their respective time of appearance and the time between two successive breakdowns.

The steps E4 to E8 are followed by the step E9 which is a comparison of the results of the steps E4 and E8.

This comparison includes a correlation of the times of appearance of the breakdown peaks coming from the accelerometric signals and the times of appearance of the breakdown peaks coming from the acoustic signals. When these times of appearance correspond, there is a validation of the times of appearance of the breakdown peaks which are thus determined with reliability. The times of appearance of the breakdown peaks in the accelerometric and acoustic signals correspond to the times of the breakdowns of the spark plugs.

Step E9 is followed by the step E10 in which the times of appearance of the breakdown peaks in the accelerometric and acoustic signals are used to:
diagnose the health of the ignition exciter box,
forecast the service life of the ignition exciter box, by using a model of damage to the ignition exciter box which takes into account the environment, earlier data and a cross-verification with the other engine.

Steps E8 and E9 are also followed by step E11 which is an extraction of a sound power indicator associated with each breakdown peak validated in step E9. A sound power indicator of a peak is determined on the basis of the time of appearance of the peak and its amplitude.

Step E11 is followed by step E12 in which the sound power indicators of the peaks are used to:
diagnose the health of the spark plugs,
forecast the service life of the spark plug by using a model of damage to the spark plugs that takes into account the environment, earlier data and a cross-verification with the other engine,
detect a replacement of the spark plug,
estimate the quality of the maintenance operation,
detect a manufacturing defect in a mounted new spark plug.

The damage to the spark plugs is directly linked to the number of breakdowns which create a stripping of particles and of elements which will moderate this damage (temperature, speed of flow).

Figure 4:
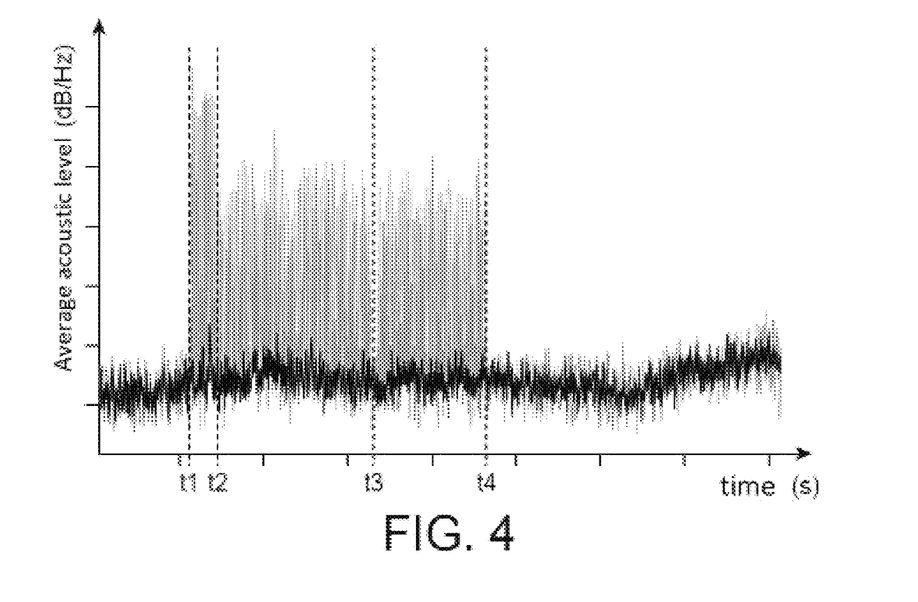
FIG. 4 illustrates a signal coming from an acoustic sensor comprised in the device of FIG. 1, according to an embodiment of the invention.

The acoustic power levels of the peaks depend on the damage to the spark plugs. Two average acoustic breakdown levels can be defined: one before the ignition of the combustion chamber and one after the ignition of the combustion chamber. Indeed, the breakdowns emit more noise before the ignition than after the ignition. This also allows to monitor or to regulate the ignition of the chamber. Furthermore, for a certain speed range, and according to a temperature condition, the injection of fuel into the combustion chamber is interrupted by a "microcutoff" logic. During the microcutoff, the breakdown of the spark plugs is also interrupted, which can be confirmed by the acoustic sensor. FIG. 4 illustrates this phenomenon.

FIG. 4 shows the signal coming from the acoustic sensor at the time of the breakdown of the spark plugs.

The breakdowns start at the time t1. Between the time t1 and a time t2, the acoustic breakdown levels (expressed in dB/Hz) are higher, which corresponds to the time interval before ignition of the combustion chamber.

The acoustic breakdown levels are lower between the time t2 and an end time t4 of the breakdowns.

Around a time t3 between the times t2 and t4, an absence of acoustic signal is noted, corresponding to an absence of breakdown because of a microcutoff.

The evaluation of a damage model, on the basis of the results of the previous flights and those measured on the ongoing flight, can comprise the calculation of the speed of flow of the jet of air in the combustion chamber during the breakdown. The jet of air is estimated via a thermodynamic model on the basis of the speeds of rotation of the engine, the position of the variable geometries, the pressures and temperatures measured at the fan and compressor (optionally booster if available), and also the sound levels associated with each peak. This model depends on the engine.

The method comprises the use of a damage model on the basis of the number breakdowns of each spark plug, the temperature measured near the combustion chamber, the pressures measured near the combustion chamber, the humidity which can be retrieved from weather bulletins of the METAR type, the calculated speed of flow, the injected fuel flow rate, the current injected by the ignition exciter box when it is measurable, as well as the time spent at various temperatures and various flow rates when the spark plugs do not break down.

Figure 5:
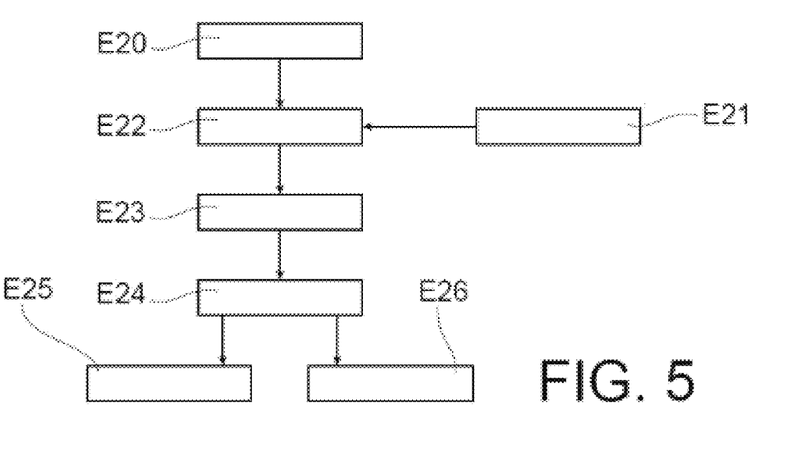
FIG. 5 illustrates a method for monitoring the health of the combustion chamber, according to an embodiment of the invention.

FIG. 5 shows an embodiment of a method for monitoring the health of the combustion chamber according to the signals delivered by the acoustic sensor 7. This method includes steps E20 to E26 implemented in the data processing unit 6 or alternatively partly in the data processing unit 6 and partly in the computer 8. These steps are implemented when the spark plugs are controlled for their breakdown, simultaneously to the steps described above.

The monitoring of the health of the combustion chamber is carried out by the study of the hooting phenomenon. Upon start-up, when the temperature of the combustion chamber is initially equal to the outside ambient temperature, a combustion instability generates a hooting noise, potentially bothersome for the user. The principles used are the following:

Damage to the combustion chamber such as cracks generate unusual resonances, and an abnormally intense hooting noise, Fouling of the combustion chamber or coking phenomena generate an attenuation of the hooting noise, and thus an abnormally low sound level.

Step E20 is the acquisition of the signals delivered by the acoustic sensor 7. This step is identical to the step E5 described above.

Step 21 is a test to verify whether the circuit for regulating the ignition 4 indicates that the chamber temperature $T_{EGT}$ is equal to the outside ambient temperature $T_{ambiante}$. If the response is positive, then the steps E20 and E21 are followed by step E22 which is an extraction of the signal corresponding to the ignition on the basis of the acoustic signals acquired in step E20. This step is identical to the step E6 described above.

The following step E23 is the application of a band-pass filter to the signal extracted in the previous step. The frequency band of the filter is chosen to correspond to the frequencies of the expected hooting phenomenon.

The following step E24 is a comparison of the acoustic energy of the filtered signal to energies coming from a reference database. The reference database includes data obtained earlier, for example on the same engine and/or on engines of the same type.

The comparison is a spectrum correlation, or a difference in PSD (power spectral density) in order to be able to establish the difference in the energies. The change in this difference over time is monitored and as long as the engine is healthy the dispersion observed must be representative only of the environmental factors. The result of the comparison is the detection of a hooting noise or not.

If a hooting phenomenon is detected, then step E24 is followed by step E25 which is the establishment of a diagnosis of the health of the combustion chamber.

If the hooting phenomenon detected is less intense, that is to say having a lower amplitude, than for the reference database, the diagnosis is that the chamber is fouled or that it has undergone coking phenomena. If the hooting phenomenon detected is more intense, that is to say having a higher amplitude, than for the reference database and resonances have been detected, the diagnosis is a crack in the combustion chamber. Step 24 is also followed by step E26 which is the establishment of a forecast of the health of the combustion chamber. The forecast determines in advance a break in trend in the change in the hooting phenomenon over time. It is thus possible to foresee a future fouling of the combustion chamber or a future crack in the combustion chamber.

What is claimed is:

1. A method for monitoring an ignition system of an aircraft turbine engine, the ignition system including at least one combustion chamber, at least one spark plug in the at least one combustion chamber, an ignition exciter box to excite the at least one spark plug, the turbine engine including at least one accelerometer and at least one acoustic sensor, the method comprising:

acquiring accelerometric and acoustic data representative of breakdown noises of the at least one spark plug, on the basis of signals produced by the at least one accelerometer and the at least one acoustic sensor, detecting times of breakdown peaks of the at least one spark plug on the basis of the accelerometric data and times of breakdown peaks of the at least one spark plug on the basis of the acoustic data representative of breakdown noises of the at least one spark plug, correlating the times of the breakdown peaks of the at least one spark plug detected on the basis of the accelerometric data and the times of the breakdown peaks of the at least one spark plug detected on the basis of the acoustic data representative of breakdown noises of the at least one spark plug, and establishing a diagnosis of health of the ignition exciter box and a diagnosis of the at least one spark plug, according to the results of the correlating.

2. The method according to claim 1, wherein the acquiring accelerometric and acoustic data includes an extraction of the breakdown signal from the signals produced by the at least one accelerometer and the at least one acoustic sensor and a low-pass filtering of the signals produced by the extraction.

3. The method according to claim 1, further comprising forecasting the service life of the ignition exciter box according to the results of the correlating and a model of damage to the ignition exciter box.

4. The method according to claim 1, further comprising forecasting the service life of the at least one spark plug according to the results of the correlating and a model of damage to the at least one spark plug.

5. A non-transitory computer readable medium storing a computer program including instructions for the execution of the method according to claim 1 when said program is executed by a computer.

6. The method according to claim 1, further comprising:

testing to verify whether the combustion chamber temperature is equal to the outside ambient temperature, and in the case of a positive answer, extracting the signal corresponding to the ignition on the basis of the signals produced by the at least one acoustic sensor, applying a band-pass filter to the extracted signal, the frequency band of the filter corresponding to hooting phenomenon frequencies, comparing the acoustic energy of the filtered signal to energies coming from a reference database, to detect a hooting noise or not, and in the case of detection of a hooting noise, establishing a diagnosis of the health of the combustion chamber.

7. The method according to claim 6, further comprising establishing a forecast of the health of the combustion chamber.

8. Device for monitoring an ignition system of an aircraft turbine engine, the ignition system including at least one combustion chamber, at least one spark plug in the at least one combustion chamber, an ignition exciter box to excite the at least one spark plug, the turbine engine including at least one accelerometer and at least one acoustic sensor, the device comprising a data processing unit adpated for acquiring accelerometric and acoustic data representative of breakdown noises of the at least one spark plug, on the basis of signals produced by the at least one accelerometer and the at least one acoustic sensor, detecting times of breakdown peaks of the at least one spark plug on the basis of the accelerometric data and times of breakdown peaks of the at least one spark plug on the basis of the acoustic data representative of breakdown noises of the at least one spark plug, correlating the times of the breakdown peaks of the at least one spark plug detected on the basis of the accelerometric data and the times of breakdown peaks of the at least one spark plug detected on the basis of the acoustic data representative of breakdown noises of the at least one spark plug and establishing a diagnosis of health of the ignition exciter box and a diagnosis of the at least one spark plug, according to the results of the correlating.

9. Device for monitoring an ignition system of an aircraft turbine engine according to claim 8, wherein the data processing unit is also capable of verifying whether the combustion chamber temperature is equal to the outside ambient temperature, and in the case of a positive response, extracting the signal corresponding to the ignition on the basis of the signals produced by the at least one acoustic sensor, applying a band-pass filter to the extracted signal, the frequency band of the filter corresponding to hooting phenomenon frequencies, comparing the acoustic energy of the filtered signal to energies coming from a reference database, to detect a hooting noise or not, and in the case of detection of a hooting noise, establishing a diagnosis of the health of the combustion chamber.

10. Ignition system of an aircraft turbine engine, the system comprising a monitoring device according to claim 8.

* * * * *